No. 768,127. PATENTED AUG. 23, 1904.
W. E. JAQUES.
MACHINE FOR MAKING PRODUCTS OF PLASTIC MATERIAL.
APPLICATION FILED JUNE 23, 1902.
NO MODEL. 3 SHEETS—SHEET 3.
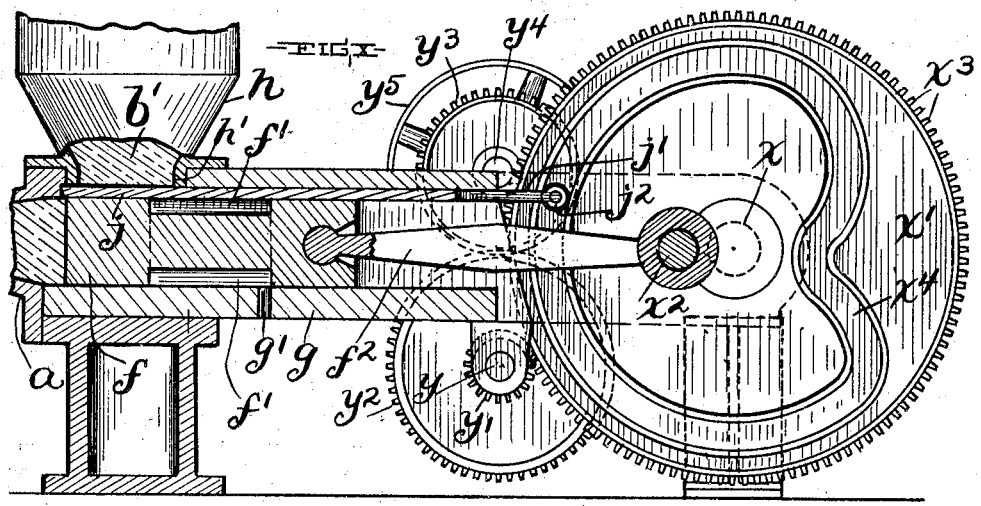
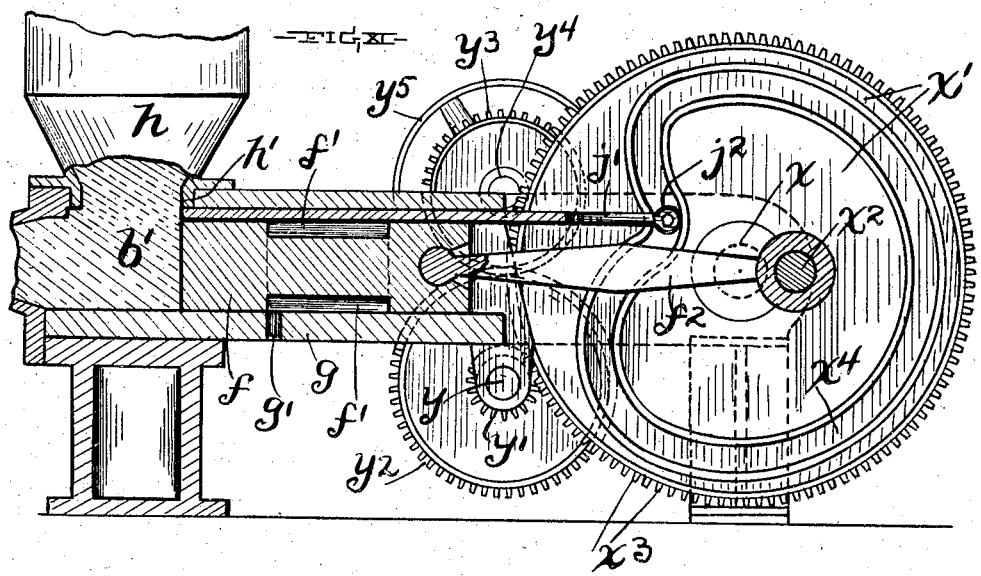
WITNESSES:
Daniel E Daly
Victor C. Lynch
INVENTOR
William E. Jaques
BY
Lynch & Dozer
his ATTORNEYS No. 768,127. Patented August 23, 1904.

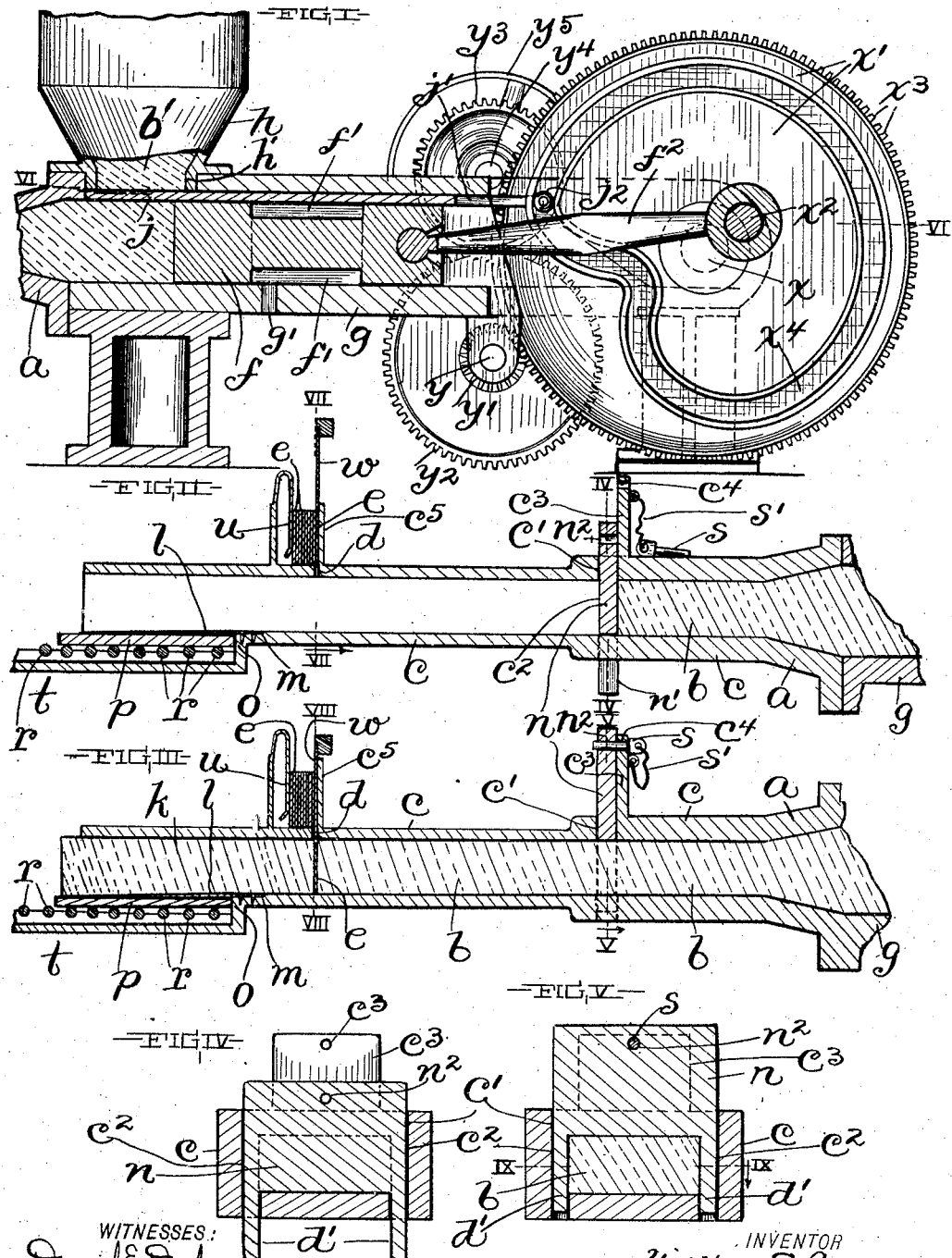

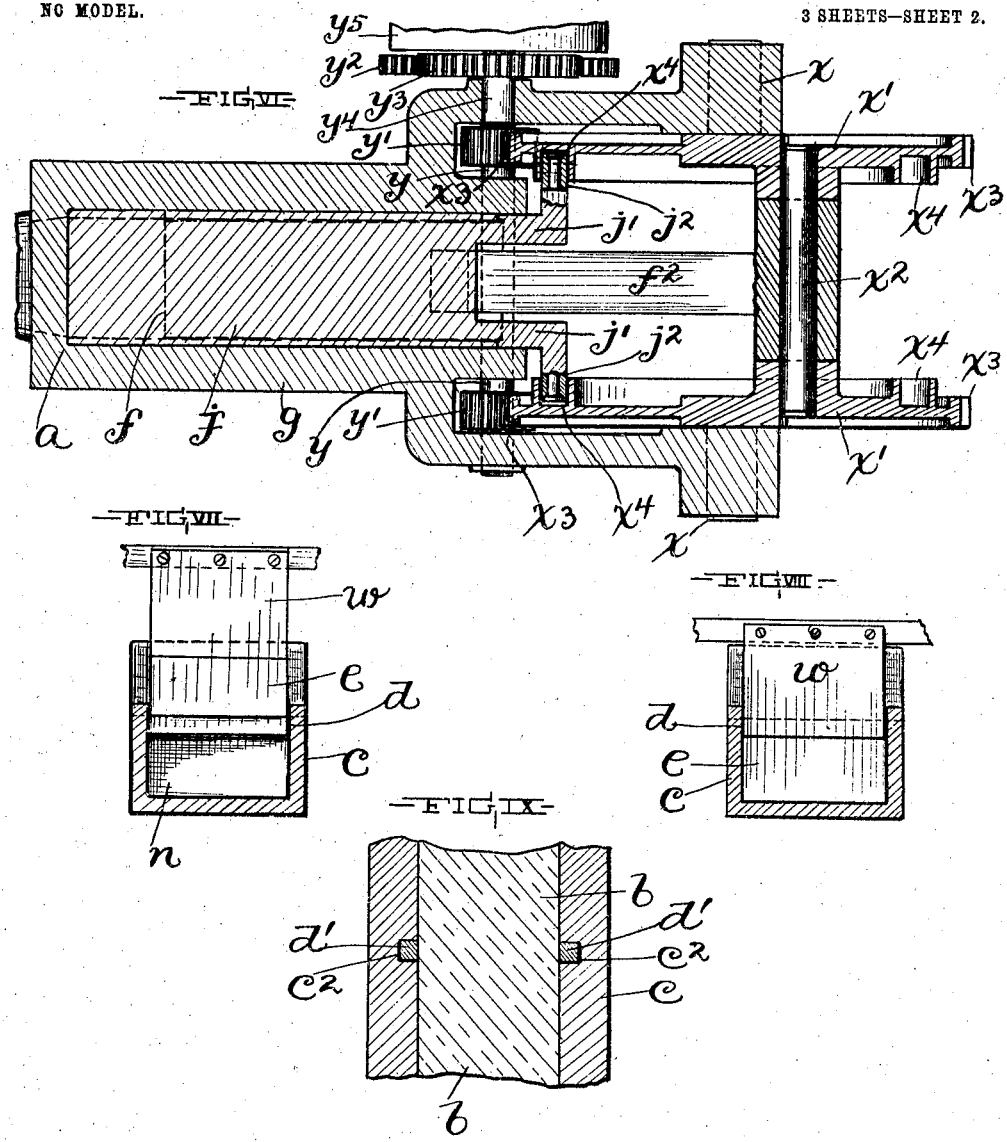

UNITED STATES PATENT OFFICE.

WILLIAM E. JAQUES, OF GRAND RAPIDS, MICHIGAN.

MACHINE FOR MAKING PRODUCTS OF PLASTIC MATERIAL.

SPECIFICATION forming part of Letters Patent No. 768,127, dated August 23, 1904.

Application filed June 23, 1902. Serial No. 112,819. (No model.)

*To all whom it may concern:*

Be it known that I, WILLIAM E. JAQUES, a citizen of the United States of America, residing at Grand Rapids, in the county of Kent and State of Michigan, have invented certain new and useful Improvements in Machines for Making Products of Plastic Material; and I hereby declare the following to be a full, clear, and exact description of the invention, such as will enable others skilled in the art to which it pertains to make and use the same.

This invention relates to improvements in machines for making products of plastic material, and more especially to a machine well adapted for use in making bricks or blocks or other products of cement or artificial stone and comprising a forming-die arranged in a horizontal plane, a plunger for forcing the plastic material through the die, a hopper arranged above and in close proximity to the forward end of the path or travel of the plunger and provided with a downwardly-discharging opening or outlet, and a valve for controlling the passage of material through the said outlet.

One object of this invention is to provide efficient and reliable means and mechanism whereby the feed of material from the hopper to and in advance of the plunger is rendered uniform, and none of the said material can after it has been fed in advance of the plunger return into the outlet of the hopper, and the additions made to the bar during successive pressure-exerting strokes of the plunger are uniform, and the said bar is permitted to remain at rest during the rearward or idle strokes of the plunger to accommodate the cutting or severing of a brick or section from the said bar.

Another object is to provide the forming-die of the machine with a long extension corresponding interiorly in cross-section and end elevation with the thickness of the plastic bar which is to be formed by and within the die, and thereby to obtain greater pressure upon the mass forming the said bar and to more properly and more closely force together the particles of the materials which compose the bar, and thereby to effect a greater compression of the said materials, or, in other words, the object of the said extension of the die in the direction in which the bar of plastic material is forced during the formation and lengthening of the bar is to exert upon the bar, all round the bar, the friction or resistance required to retard the progress of the bar and to increase the pressure on the bar and to materially enhance the compactness of the mass composing the bar by utilizing the tendency of the said mass to expand whenever more material is added to the bar at the inner end of the bar by pressure exerted by the plunger during the pressure-exerting strokes of the plunger.

Another object is to provide means whereby the forward movement or progress of the plastic bar is arrested soon after the commencement of the operation of the machine and a farther advance of the bar is avoided until the die has been completely and most compactly filled up to its receiving extremity, whereupon the said bar-arresting means is removed or rendered inoperative, and the resistance to the bar by the internal walls of the die extension whenever the bar tends to expand by pressure exerted upon its inner end by the plunger results in additional pressure upon the bar and insures a well-formed bar of great compactness, a feature of paramount importance in making products of cement or cementitious material.

Another object is to provide suitable means for cutting or severing sections from the plastic bar while the bar is within the die extension by the introduction into the die extension of knives which correspond in dimensions widthwise and vertically to the said bar and which are adapted to be left in their inserted position with the sections cut thereby from the bar to prevent the sticking of the section last cut from the bar to the outer end of the remaining portion of the unsevered bar and to the next proceeding section and to prevent the sticking together of any two sections cut from the bar before the setting of the cement or material composing the said sections.

With these objects in view and to render the machine compact and simple and durable in construction and reliable in its operation and to realize other advantages hereinafter appearing my invention consists in certain features of construction and combinations of parts hereinafter described, and pointed out in the claims.

In the accompanying drawings, Figure I is a side elevation, largely in central section, of a portion of a machine or apparatus embodying my invention. Figs. II and III are side elevations in section of a portion of the machine not illustrated in Fig. I. Fig. IV is a vertical section on line IV IV, Fig. II, looking inwardly. Fig. V is a transverse vertical section on line V V, Fig. III, looking in the direction indicated by the arrow. Fig. VI is a top plan in section on line VI VI, Fig. I. Fig. VII is a vertical section on line VII VII, Fig. II, looking in the direction indicated by the arrow. Fig. VIII is a vertical section on line VIII VIII, Fig. III, looking inwardly. Fig. IX is a top plan in horizontal section on lines IX IX, Fig. V. Fig. X is a side elevation, largely in section, of a portion of the machine and shows the plunger in position at the completion of its forward or pressure-exerting stroke. Fig. XI is a side elevation, largely in section, corresponding with Fig. X, except that in Fig. XI the plunger is shown at the end of its rearward or idle stroke and the valve-forming slide is shown in an open position.

Referring to the drawings, $a$ designates an ordinary open-ended forming-die of a brick-machine, which die is arranged in a horizontal plane and has its chamber gradually reduced in dimensions from its inner and receiving end outwardly toward the outer and discharging end of the die.

The die $a$ has an extension $c$, which projects in a horizontal plane outwardly in the direction in which the bar $b$, of unset cement or plastic material, formed by and within the die, is forced. The die extension $c$ is formed by a suitably-applied open-ended box or case, and of course the passage-way formed by and interiorly of the said die extension corresponds in end elevation and cross-section to the thickness of the bar $b$ forced into and through the die extension, whose internal walls snugly incase and are instrumental in sleeking or troweling or smoothing the said bar.

The bar may be severed into sections vertically and transversely at any suitable point between the ends of the die extension $c$, preferably a suitable distance from the inner end of the said extension, and the top of the conduit where the severing operations can take place is provided with a slot or aperture $d$, as shown in Figs. II, III, VII, and VIII, to accommodate the introduction and operation of a severing blade or knife $e$.

The bar $b$ is intermittently forced along the passage-way formed by and interiorly of the die extension $c$ by a plunger $f$, with which the machine is provided. The cement or plastic material is prepared and then delivered in advance of the plunger $f$, by which it is forced through the die $a$ and the die extension $c$. The die obviously communicates, therefore, with the path of the plunger $f$, which path is formed in line with the die $a$ by and within a case $g$, which forms a guide for the plunger.

Above the forward end of and in close proximity to the case $g$ is a hopper $h$, which is provided at its lower end with a downwardly-discharging opening or outlet $h'$, arranged to communicate with the chamber of the said case and with the chamber of the die when the valve-forming slide $j$, which is adapted to close the said outlet from below, is in an open position, as shown in Fig. XI. By the relative arrangement of the parts and the operation of mechanism hereinafter described it will be observed that the valve $j$ is in its closed position during the pressure-exerting stroke of the plunger, that the said valve does not begin to open until the plunger has commenced its rearward or idle stroke, that material $b'$ drops from the outlet of the hopper into the chamber of the case $g$ in advance of the plunger and into the chamber of the die $a$ as soon as the said valve begins to open, and that the said valve again closes before the next succeeding pressure-exerting stroke of the plunger commences. It will be observed also that none of the material fed to and in advance of the plunger preparatory to a pressure-exerting stroke of the plunger can return during the said stroke of the plunger to the outlet of the hopper, that the feed of material is uniform, that the additions to the column or bar emerging from the outer and discharging end of the die extension $c$ are uniform, and that the said bar rests during the rearward or idle strokes of the plunger, so as to accommodate the cutting or severing of a section from the said bar.

In Figs. II and VII a knife $e$ is shown in position ready to be forced into the passage-way formed by and within the die extension, and in Figs. III and VIII the said knife is shown introduced into the said passage-way, and consequently inserted into and transversely of the bar $b$. The said knife $e$ is a thin metal plate which corresponds in dimensions vertically and widthwise to the depth and width, respectively, of the said bar. The said knife $e$ is left in its inserted position between the section cut thereby from the bar $b$ and the outer end of the remainder of the bar and prevents sticking of the said section to the said remainder of the bar and to any section next in advance of it. The said knife is advanced toward the outer and discharging end of the conduit during the next succeeding forward and pressure-exerting stroke of the plunger a distance equal to the length of the addition made to the bar $b$ during the said stroke of the plunger, and the die extension $c$, as already indicated, extends far enough outwardly in the direction of its said end beyond the place at which the severing operations take place to cause a brick or section $k$ cut from the bar to be moved long enough in contact at its upper and lower surfaces and at the ends with the internal walls of the die extension to result in the sleeking or troweling of the said section $k$ upon its said surfaces and to rebuild or repair any broken or mutilated corners or edges of the said section, and hence it will be observed that any roughness or imperfections occasioned at or along the corners or edges of a brick or section $k$ during the severing operation are subsequent to the severing operation removed and the bricks or sections emerging from the outer or discharging end of the die extension are not only troweled or sleeked as aforesaid, but have their corners or edges in perfect condition. Each brick as it emerges from the outer and discharging end of the die extension $c$ finds a bearing upon a pallet $p$, which is placed in proper position at the said end of the die extension, as shown in Figs. II and III.

The pallet $p$ is arranged upon and longitudinally of a horizontally-arranged stationary table $t$, which extends in under and longitudinally of the outer portion of the die extension. The table $t$ extends far enough beyond the outer and discharging end of the die extension to accommodate the movement of the said pallet from its extreme inner and normal position, as shown, endwise and outwardly and to render the said pallet capable of receiving from the conduit the section or sections $k$ cut from the bar $b$ while the bar is at rest between two successive pressure-exerting strokes of the plunger.

To reduce the slight descent of a section or product emerging from the outer and discharging end of the die extension $c$ onto the pallet to a minimum, and thereby avoid injury to the said product, (and the latter is easily injured, because the cement or artificial stone of which it is composed has not yet set,) the bottom of the passage-way formed by the outer portion of the die extension between the outer extremity of the die extension inwardly longitudinally of the said die extension as far as the pallet normally extends in under the said bottom is formed by a thin metal plate $l$, having a smooth upper surface and set into, as at $m$, and suitably secured to the bottom of the die extension at the inner end of the said plate. The plate $l$ is supported, therefore, only at its inner end and has the capability of yielding to any load thereon and sag onto the pallet extending thereunder.

A stop for limiting the inward movement of the pallet under the bottom-forming plate $l$ of the die extension is provided and comprises a wall $o$, arranged at and transversely of the inner end of the table $t$ between the said table and the plate $l$ and facing toward the outer end of the table.

The addition made to the bar $b$ during each pressure-exerting stroke of the plunger is just large enough to make a predetermined product—one large brick, block, or section $k$, as illustrated—and if, therefore, such addition to the bar during each pressure-exerting stroke of the plunger were twelve inches long a section twelve inches long would be cut or severed from the bar by the knife $e$ inserted into the passage-way formed by the die extension, as aforesaid, between two successive pressure-exerting strokes of the plunger.

The table $t$ has the pallet-bearing surfaces thereof formed, preferably, by suitably-applied rollers $r$, which are arranged in a horizontal plane and extend transversely of the table. Obviously the rollers $r$ can be readily driven by suitably-applied mechanism (not shown) at the speed required to move the pallet endwise in unison with the movement of the bar $b$, or such mechanism may be omitted and the friction had between the pallet and the product or load arriving upon the pallet as the said product is shoved onto the pallet during a movement of the said bar will result in the desired movement of the pallet longitudinally of and outwardly upon the table $t$ as required to render the pallet capable of receiving the remainder of its load discharged or emerging from the die extension $c$ during the said movement of the bar.

When the pallet has received its full load during a pressure-exerting stroke of the plunger, a removal of the laden pallet from the table $t$ is effected and another unladen pallet is placed in its load-receiving position upon the said table.

A feature of no inconsiderable importance consists in the provision of means whereby the forward movement or progress of the plastic bar is arrested within the die extension at a point between the place at which the severing operations take place and the inner or receiving end of the die, which means in the machine illustrated (see Figs. II, III, IV, and V) comprises an abutment-forming vertically-arranged slide $n$, adapted to interrupt continuity in the passage-way formed by and interiorly of the die extension. The slide $n$ is shown arranged at a suitable point between the inner or receiving end of the die extension and the place at which the severing operations take place, and the top wall of the die extension is slotted vertically and transversely, as at $c'$, to accommodate the location and operation of the said slide, and the side walls of the die extension (see also Fig. IX) are provided with grooves $c^2$, which extend from top to bottom of the die extension and are open at the ends and connect at their upper ends with the slot $c'$. The grooves $c^2$ therefore accommodate the location of the arms $d'$, with which the slide $n$ is provided and which depend from the slide at opposite sides, respectively, of the die extension. It will be observed, therefore, that two grooves $c^2$ and $c^2$ are formed directly opposite each other in opposite side walls, respectively, of the passage-way formed by and interiorly of the die extension and constitute slideways for the slide $n$ and the depending slide-arms $d'$, and the arrangement of parts is such that the lower edge of the slide proper when the slide is in its upper and inoperative position, as shown in Figs. III and V, shall be flush with the top wall of the said passage-way and the inner and opposing edges of the slide-arms $d'$ shall be flush with the different side walls, respectively, of the said passage-way, as shown in Fig. IX, and therefore the grooves $c^2$ and the slot $c'$ are occupied by the slide $n$ and its arms $d'$ in the upper or elevated or inoperative position of the said slide without protruding into the passage-way formed by and interiorly of the die extension, and material from the bar $b$, formed in the die and forced longitudinally of the die extension during successive pressure exerting strokes of the plunger, cannot be displaced into the said grooves and slot.

The slide $n$ is large enough in dimensions vertically and widthwise to extend both vertically and widthwise completely across the said passage-way, so that the said slide in its lower and operative position, as shown in Figs. II and IV, forms an abutment for the outer end of the bar $b$, which is formed by the die during the forcing of material into the die extension during the pressure-exerting strokes of the plunger, and I would here remark that the said slide is placed in its said lower and operative position preparatory to the operation of the machine, so that the forward movement or progress of the bar of cement or plastic material is arrested soon after the commencement of the operation of the machine and a farther advance of the said bar is avoided until the die has been completely and most compactly filled with material up to its receiving extremity, as shown in Fig. II, whereupon the said slide or abutment is elevated or withdrawn from the aforesaid passage-way and thereby rendered inoperative; but preferably the said slide is left in its lower and operative position until the material between it and the receiving extremity of the die has received such compactness by the introduction thereinto of material forced into the die during several successive pressure-exerting strokes of the plunger that the internal walls of the die extension, whenever the bar of material tends to expand by the pressure exerted upon its inner end by the plunger, shall resist and positively exert additional pressure upon the bar, so as to insure a well-formed bar of great compactness, an essential feature in making products of cement or cementitious material. Not unimportant, however, is a die extension $e$ of great length, because thereby additional pressure is exerted by the internal walls of the die extension upon the bar whenever the bar tends to expand by pressure upon its inner end by the plunger, so as to more properly and more closely force together the particles of the materials which compose the bar. In other words, the object of a long extension of the die in the direction in which the bar of plastic material is forced during the formation and lengthening of the bar is to place upon the bar, all round the bar, the friction or resistance required to retard the progress of the bar, and thereby to increase the pressure on the bar and materially enhance the compactness of the mass composing the bar by utilizing to advantage the tendency of the said mass to expand during the pressure-exerting strokes of the plunger.

The slide $n$ may be shifted from the one to the other of its positions manually or otherwise, and any suitable means capable of holding the said slide in its upper and elevated position is provided, and the means shown comprises a pin $s$, which is adapted to engage a hole $c^4$, formed in the upper end of an upright arm or bracket $c^3$, arranged at one side of the path of the said slide and rigid with the top of the die extension, as shown in Fig. III, which pin is shiftable endwise of and adapted to extend through the hole $c^4$ into a corresponding hole $n^2$, formed in the slide $n$, and the arrangement of the parts is such that in the elevated and inoperative position of the said slide the holes $n^2$ and $c^4$ are in registry. The pin $s$ is shown attached by a chain $s'$ to the bracket $c^3$. Obviously the withdrawal of the pin $s$ from the slide $n$, when the slide is in its upper and inoperative position, releases the said slide and permits the slide to drop into its lower and operative position. I would have it understood, however, that my invention, so far as a long die extension and any means for arresting or retarding the movement of the plastic bar is concerned, is not limited to any details of construction.

Again, referring to the severing operation, it will be observed that the top of the die extension between the slot $d$ and its inner or receiving end and next to the said slot is provided with a vertically-arranged wall $c^5$, which extends a suitable distance above the die extension and faces in the direction of the outer end of the die extension, and a row of knives $e$ are arranged over the die extension between the said wall $c^5$ and the outer end of the die extension and are pressed in the direction of and against the said wall by a suitably-applied spring-follower $u$, and the arrangement of parts is such that the knife next to the said wall is in position ready to descend through the slot $d$, and the said slot is only wide enough to accommodate the passage therethrough of one knife at a time, and a vertically-movable plunger-forming plate $w$, which corresponds in thickness to the thickness of a knife, is shown arranged over the knife, which is in line with the slot $d$. By means of the plate $w$ the last-mentioned knife is readily forced into and through the bar $b$. In Figs. II and VII a plunger-forming plate $w$ is shown ready to operate upon a knife $e$, and in Figs. III and VIII the said knife is shown inserted into the bar $b$. The plunger $w$ is applied and operated manually or otherwise, and obviously the wall $c^5$ also forms a guide and lateral bearing for the said plunger $w$ during the operation of the plunger.

The plunger $f$ is provided centrally between its ends with an external annular chamber $f'$, and the case $g$ is provided at the bottom of the said chamber with a hole or slot $g'$, which extends downwardly from the said chamber and discharges downwardly, and the arrangement of the parts is such that the one or the other end of the chamber $f'$ is in position over the upper and receiving end of the slot or hole $g'$, according as the plunger is in the one or the other of its extreme positions, and obviously material obtaining ingress between the opposing surfaces of the plunger $f$ and the case $g$ will upon reaching the chamber $f'$ be carried by the end walls of the said chamber during the reciprocation of the plunger to and over the hole $g'$ and there escape from the case $g$.

The mechanism for operating the plunger $f$ comprises, preferably, a pitman $f^2$, which establishes operative connection between the plunger and the crank of a crank-shaft $x$, (see Figs. I, X, and XI,) which is arranged horizontally and at right angles to the path of the plunger and supported in any approved manner. The crank of the shaft $x$ is preferably in the form of a double-wheel crank comprising two wheels $x'$ and $x'$, which are of no inconsiderable size diametrically and are connected together by a pin $x^2$, which forms the wrist of the crank and is embraced by the adjacent end of the pitman. Spur-teeth $x^3$ are formed upon the periphery of each wheel $x'$ at equal intervals circumferentially of the wheel, and each wheel $x'$ is also provided with a groove, slot, or guideway $x^4$, which extends around the axis of the wheel and has the trend required to form a cam. It will be observed, therefore, that each wheel $x'$ is a combined spur-gear and crank provided with a cam, and both wheels $x'$ correspond diametrically, and the cams of both wheels are uniform in trend and arrangement.

The slide $j$ is provided with two corresponding and parallel roller-bearing arms $j''$ and $j''$, which extend toward the crank of the shaft $x$, and the roller $j^2$ of one of the said arms engages the cam-forming guideway of one of the wheels $x'$, and the roller of the other arm $j^2$ engages the cam-forming guideway of the other wheel $x'$.

The arrangement of the parts and the trend of the cams of the wheels $x'$ are such that the slide $j$ is closed after the completion of each idle stroke of the plunger, so as to avoid displacement of material into the outlet of the hopper during the next succeeding pressure-exerting stroke of the plunger and remains closed while the said plunger is forcing material into the die and commences to open upon the completion of each pressure-exerting stroke of the plunger to permit a new charge of material from the hopper to and in advance of the plunger during the next succeeding idle stroke of the plunger.

The wheels $x'$ have their toothed peripheries in mesh with pinions $y'$, which are operatively mounted upon a shaft $y$, supported in any approved manner and shown arranged below the case $g$ and parallel with the crank-shaft, and the shaft $y$ is operatively provided with spur-gears $y^2$, which mesh with pinions $y^3$ of the driving-shaft $y^4$, which is supported in any approved manner and operatively provided with a driving-pulley $y^5$, to which power is applied in the usual manner.

What I claim is—

1. The combination, with an open-ended forming-die having an extension provided interiorly with an open-ended passage-way and means for forcing the plastic material into the die and into its extension, of an abutment-forming slide extending in one of its positions transversely of the aforesaid passage-way and into two opposing walls of the said passage-way and through one of the remaining walls, which slide is removed from the said passage-way in its other position, and the aforesaid opposing walls being grooved or cut away to form slideways for the slide and the slide having arms arranged to occupy the said slideways in the non-obstructive position of the slide.

2. The combination, with an open-ended forming-die having an extension which has an interiorly-open-ended passage-way and is provided, in one of its walls, with a slot extending transversely of the said extension, and means for forcing the plastic material into the die and into its extension, of an abutment-forming wall arranged at one side of and parallel with the said slot; a row of knives arranged at that side of the said wall at which the aforesaid slot is located and parallel with the said slot and having the dimensions required to render them capable, respectively, of passing into the aforesaid passage-way through the slot and cutting or severing a section from the bar within the said passage-way, and means acting to hold the said row of knives against the aforesaid wall, and the aforesaid slot having the dimensions and arrangement required to accommodate the operation of only one knife at a time.

3. The combination, with an open-ended forming-die having an extension which has an interior open-ended passage-way and is provided, in one of its walls, with a slot extending transversely of the said wall, and means for forcing the plastic material into the die and into its extension, of an abutment-forming wall arranged at one side of and parallel with the aforesaid slot; a row of knives arranged at that side of the said wall at which the said slot is located and parallel with the slot and having the dimensions required to render them capable, respectively, of cutting or severing a section from a bar in the aforesaid passage-way, and a spring-follower acting to hold the said row of knives against the aforesaid wall, and the aforesaid slot having the arrangement and dimensions required to accommodate the reception thereby and operation of only one knife at a time.

4. The combination, with an open-ended forming-die having an extension which has an interior open-ended passage-way and is provided, in one of its walls, with a slot extending transversely of the said wall, and means for forcing the plastic material into the die and into its extension, of an abutment-forming wall arranged at one side of and parallel with the aforesaid slot; a row of knives arranged at the side of the said wall at which the said slot is located and parallel with the slot and having the dimensions required to render them capable, respectively, of cutting or severing a section from a bar in the aforesaid passage-way; means acting to hold the said row of knives against the aforesaid wall, and a plunger-forming plate arranged to engage one knife at a time and actuate the same into the die extension, and the aforesaid slot having the arrangement and dimensions required to accommodate the operation of only one knife at a time.

5. The combination, with an open-ended forming-die having an extension which has an interior open-ended passage-way and is provided in one of its walls with a slot extending transversely of the said wall, and means for forcing material to be operated upon into the die, of an abutment-forming wall arranged at one side of and parallel with the aforesaid slot externally of the aforesaid passage-way, a knife arranged at that side of the said wall at which the said slot is located and parallel with the slot and having the dimensions required to render it capable of cutting or severing a portion of a bar in the aforesaid passage-way, means acting to hold the knife against the said wall, and means for actuating the knife into the said passage-way at the aforesaid slot and leaving the knife in said passage-way, and the said slot having the arrangement and dimensions required to accommodate the operation of the knife.

6. The combination, with an open-ended forming-die having an extension which has an interior open-ended passage-way and is provided, in one of its walls, with a slot extending transversely of the said wall, and means for forcing the material to be operated on into the die, of an abutment-forming wall arranged at one side of and parallel with the aforesaid slot; a knife arranged at the side of the said wall at which the said slot is located and parallel with the slot and having the dimensions required to render it capable of cutting or severing a section from a bar in the aforesaid passage-way; means acting to hold the said knife against the aforesaid wall, and a plunger-forming plate arranged to actuate the said knife into the aforesaid passage-way, and the aforesaid slot having the arrangements and dimensions required to accommodate the operation of the said knife.

7. The combination, with an open-ended forming-die arranged in a horizontal plane, a plunger arranged in line with the die, a case forming a guideway for the plunger and in open relation with the die, a hopper arranged to discharge into the said case and into the die in advance of the plunger during the idle strokes of the plunger, and a slide arranged to close the outlet of the hopper from below and resting and having bearing upon the plunger, of a crank-shaft having a double-wheel crank whose wrist extends between the two wheels of the crank, which wheels correspond diametrically and are arranged at one end of the said travel and have corresponding cam-forming guideways and are uniformly toothed upon their peripheries to form spur-gears; rollers engaging the aforesaid cam-forming guideways and borne by the aforesaid slide; a pitman operatively connecting the wrist of the crank with the plunger; pinions meshing with the aforesaid spur-gears, and means for driving the shaft, and the arrangement of the parts and the trend of the aforesaid guideways being such that the slide shall be actuated into a closing position after each idle stroke of plunger and remain closed long enough to avoid displacement of material from in advance of the plunger into the outlet of the hopper during the next succeeding pressure-exerting stroke of the plunger and shall again open upon the completion of the said last-mentioned stroke of the plunger.

In testimony whereof I sign the foregoing specification, in the presence of two witnesses, this 12th day of April, 1902.

WILLIAM E. JAQUES.

Witnesses:
C. H. DORER,
TELSA SCHWARTZ.